C. I. LOPDELL.
BAND CLIP.
APPLICATION FILED AUG. 27, 1921.
1,412,187.
Patented Apr. 11, 1922.
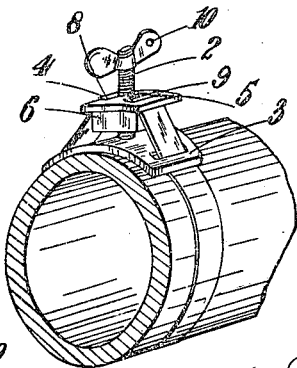
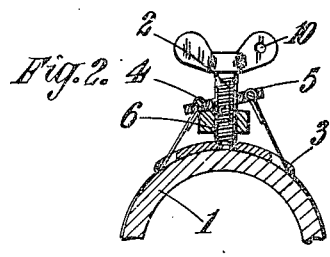
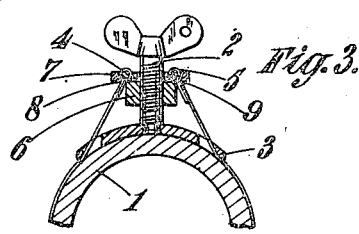
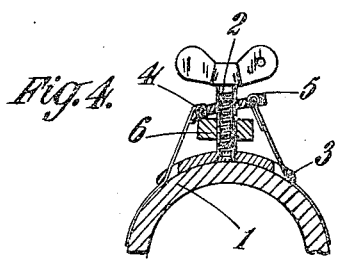
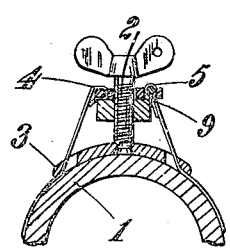
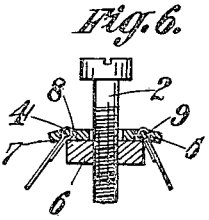
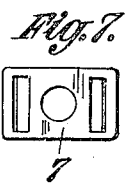
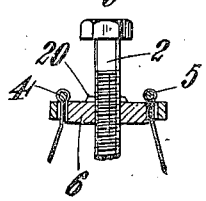
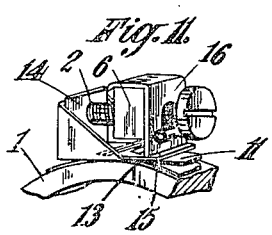
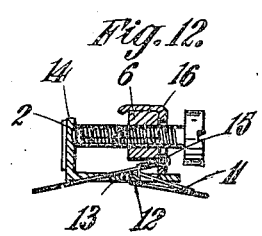
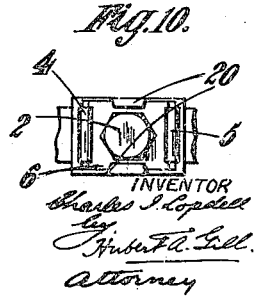
INVENTOR
Charles I. Lopdell
by
Hubert F. A. Gill.
Attorney

UNITED STATES PATENT OFFICE.

CHARLES I. LOPDELL, OF SURBITON, ENGLAND.

BAND CLIP.

1,412,187.  Specification of Letters Patent.  Patented Apr. 11, 1922.

Application filed August 27, 1921. Serial No. 496,155.

(GRANTED UNDER THE PROVISIONS OF THE ACT OF MARCH 3, 1921, 41 STAT. L., 1313.)

*To all whom it may concern:*

Be it known that I, CHARLES IEVERS LOPDELL, a subject of the King of Great Britain, and resident of 2 Westfield Place, Surbiton, in the county of Surrey, England, have invented certain new and useful Improvements in Band Clips, (for which I have filed an application in England, No. 136.272, dated December 13th, 1918, and an application in France, No. 507,564, dated December 19th, 1919,) of which the following is a specification.

This invention relates to band clips or clamping devices and the like wherein a band usually formed of metal, embraces the article to which the clip is to be applied, and is tightened up by suitable means so as to apply the necessary constricting pressure. Such clips are used for a variety of purposes, including the securing of tubular hose to metal sockets, or the attachment of articles to cylindrical metallic parts as in the case for example of the attachment of cycle bells to handlebars. In clips of this type one difficulty which is experienced is in making a strong but convenient form of connection between the ends of the band and the nut or the like by which the tension is applied. The object of the present invention, is to provide a clip having a strong and quickly detachable connection between the ends of the band and the nut or the like by which the tension is applied.

The accompanying drawings show examples of clips made according to the present invention. In the said drawings:—

Figure 1 is a perspective view of one type of clip according to the invention.

Figures 2 and 3 are detail views in section showing two different stages in the fastening of the clip in position.

Figures 4 and 5 are similar views to those of Figures 2 and 3 but showing one end of the band fastened to the slotted plate.

Figure 6 is a sectional elevation of a clip similar to that of Figure 1 but wherein the ends of the slotted plate are turned down at a slight angle.

Figures 7 and 8 are detail plan views of two alternative forms of slotted plates.

Figures 9 and 10 are an elevation and plan view respectively of a clip wherein the function of the slotted plate is served by a member of tubular or sleeve-like form.

Figure 11 is a perspective view, and

Figure 12 is a sectional elevation of an alternative form of clip according to the present invention.

Referring to Figures 1 to 5 of the drawings, the numeral 1 indicates the body such as the end of a hose pipe connection, on which the clip is mounted. The tightening screw 2 which bears upon a slotted bridge piece 3 through which the ends 4 and 5 of the band are passed, has a rectangular nut 6 working on it, and on the stem of the screw 2 above the nut slides freely a plate 7 with two slots in it at 8 and 9. The ends 4 and 5 of the bands are passed through these slots and are provided with enlargements in any convenient way, preferably by looping them around short bars or sections of wire, as shown in Figures 2 and 3, which show how the band ends are inserted. When the band is slack and the nut 6 is low down on the screw, the ends of the band can be passed freely into the slots of the plate 7, but as the nut is tightened its straight sides pulling up against the bottom of the plate close the slots except for a narrow slit at each side just wide enough for the band and its turned back ends to pass through, so that the enlargements at 4 and 5 formed by the looping of the band over the short bars or wires, are caught in the slots of the plate. As the screw is turned further to pull up the nut, the gripping of the ends of the band becomes tighter and tighter, and the band can be made to apply any required constricting pressure without risk of the ends bursting asunder. A hole may be formed at 10 on the head of the screw for passing a wire therethrough for locking purposes.

Instead of arranging for both ends of the band to be detachably engaged in this way in the slotted plate, it may be more convenient to connect or engage one end of the band in a permanent manner to the slotted plate leaving only the other end to be gripped in the manner described. For instance if one slot in the plate is made so narrow that the enlarged end of the band cannot pass through it, this end will be permanently held. Again, instead of having a thickening member, the one end, say 4, of the band can be looped over a bar forming part of the slotted plate 7, as in Figures 4 and 5, so that the nut will still grip this end in the manner above described, but on releasing the nut this end will not slip out from the plate unless it is intentionally unlooped therefrom. If the band is merely looped around a bar on the plate this renders the length of the band readily adjustable, and if the bridge piece 3 which bears on the cylindrical surface to which the band is applied, is comparatively narrow, the clip can be used for engaging on articles of a wide range of sizes. It can be sold for instance with a band long enough for engagement around an object of two or three inches in diameter, while by looping more of the band through the clip it can be reduced in size to embrace tightly an object of one inch or less in diameter. The excess length of the band will generally be broken or cut off, of course, when the clip is applied.

The slotted plate 7 used in the clip may be a simple stamping, but it is desirable that the slots should be shaped so as to taper a little toward the bottom, to insure the wedging or tightening into the slots of the enlargements on the ends of the band whether the nut is of exactly the correct width or not. In Figure 6 the slotted plate 7 is shown with its ends turned down at an angle in order to make the walls of the slots taper downwardly for this purpose. The bending is effected along a line represented by the bottom outer edge of the slot, and is through an angle of say 15° or 20°. The enlarged ends 4 and 5 now exert a positive downward pull on the plate 7 against the outwardly inclined faces of the slots, resisting any tendency to disengage the clip by forcing up the plate 7.

Figure 7 shows in plan the type of slotted plate as used in Figure 6. Figure 8 shows a modified form wherein the central aperture is continued into one of the slots. This gives a little more freedom of movement in engaging first one end of the band with the plate, and then turning it up as in Figure 2 to allow the other end to be engaged.

Any convenient method may be adopted for forming an enlargement on the end of the band for engaging purposes, but the method of bending back the end of the band around a short length of a rod or wire seems to be the simplest and most convenient for most purposes.

The term "slotted plate" hereinbefore used, is not necessarily limited to a flat or substantially flat plate, as it may have an arched shape, or its sides may be bent down to embrace the nut. For instance, in the form shown in Figures 9 and 10, the plate may become practically a tube or sleeve 19 of square section which just slides over the nut 6 with sufficient space to accommodate the thickness of the band at either side, the enlarged ends 4 and 5 of the band then being held between the top of the nut and the inside walls of the square tube or sleeve. The sleeve 19 is prevented from slipping down over the nut 6 by means of lugs 20 turned inwards at its upper edge.

The essential feature of the invention resides in the formation of the tightening member in two parts which are separable to some extent to allow the end or ends of the band to be passed through, but which are held tightly together when the screw is turned to apply tension to the nut so as to prevent the ends of the band from slipping back. Instead of a nut and screw for tightening purposes any equivalent means of tightening may be used operating a member equivalent to the nut, and serving in any case to draw out the ends of the band through the slotted bridge piece or its equivalent, and to co-operate with the slotted plate in holding the band in the tensioned position.

The same method of locking or holding and releasing the ends of the band is applicable not only to the precise form of clip described wherein the two ends of the band are drawn out together through a bridge piece, but it may be applied also to other more or less equivalent forms of clips, in which, for example, the one end of the band is drawn through a slot in the other end, or in a fitting secured to the other end, and is pulled up to tigthen it by means of a nut or the like. The end of the band which is so pulled up may be engaged with its nut or tensioning member precisely in the manner above described. In the construction shown in Figures 11 and 12, one end 11 of the band is looped over a bar 12 in a slotted plate 13 having a turned-up lug 14 formed with a recess or seating for the end of the screw 2 to engage with. The other end 15 of the band is passed through the slot in the plate so as to overlie the adjustable end of the band, and is turned back on itself around a short bar to form an enlarged end piece. This is tightened by engagement in the slot of a little plate 16 overlying the nut 6 which is pulled out by means of the screw 2. The slackening of the nut 6 enables the end of the band to be slipped out freely by separating the slotted plate 16 with which the end 15 engages from the nut 6 against which said plate lies while the band is under tension. One advantage of a clip of this character over the clip of the type first described, resides in the fact that the screw is approximately tangential so that there is less projection from the circumference of the member to which the clip is applied.

Having thus described my invention what I claim as new and desire to secure by Letters Patent is:—

1. A band clip device comprising a slotted bridge piece adapted to bear on the member to which the clip is applied, a tightening member bearing on said slotted bridge piece, a nut member adapted to be drawn outwardly by said tightening member, a plate with apertures therein adapted to be drawn outwardly with said nut member and a band having means of connection between one end thereof and a portion of the clip proper, said band also having an enlargement at its other end adapted to pass through an aperture in said plate when the plate is released from the nut member, the relative dimensions of the apertured plate, the nut member and the enlarged end of the band being such that when the nut member is drawn out the enlarged end of said band is prevented from passing out between said apertured plate and nut member.

2. A band clip device comprising a slotted bridge piece adapted to bear on the member to which the clip is applied, a screw member bearing on said slotted bridge piece, a nut member adapted to be drawn outwardly by said screw, a plate with apertures therein adapted to be drawn outwardly with said nut member and a band having means of connection between one end thereof and a portion of the clip proper, said band also having an enlargement at its other end adapted to pass through an aperture in said plate when the plate is released from the nut member, the relative dimensions of the apertured plate, the nut member and the enlarged end of the band being such that when the nut member is drawn out the enlarged end of said band is prevented from passing out between said apertured plate and nut member.

3. A band clip device comprising a slotted bridge piece curved to a shape such that it will bear on the surface of the member to which the clip is to be applied, a band adapted to pass through the slots in said bridge piece and to embrace the member to which the clip is to be applied, a screw bearing at one end on said bridge piece, a nut in engagement with said screw, an apertured plate adapted to overlie said nut, said band having an enlargement at one end adapted to pass freely through an aperture in said plate when the plate is freed from said nut, while the other end of said band is adapted to be passed through an aperture in said plate and to be gripped between said plate and said nut when the nut is tightened outwardly against said plate by the screw, the relative dimensions of the enlarged end of the band, the aperture in the plate in which it engages and of the nut in relation to the plate being such that when the nut is tightened outwardly by turning of the screw, the enlarged end of the band is prevented from passing through the gap between the edge of the aperture in the plate and the outer face of the nut.

4. A band clip device comprising a bridge piece with slots near to each end thereof, a band adapted to be passed through said slots, a screw adapted to bear on said bridge piece in a direction substantially normal to the surface of the bridge piece, a nut having two straight side faces, said nut being in engagement with said screw, an apertured plate through which the screw passes freely, said plate being adapted to rest normally against the outer face of said nut, one aperture in said plate being adapted to be engaged by one end of the band which is passed therethrough and turned inwardly in such manner that it may be clamped between said nut and plate, while the other end of said band has an enlargement adapted to pass through another aperture in said plate, the said other aperture being so dimensioned and disposed that when the nut is tightened outwardly against the under-face of said apertured plate the edge of the nut and one side of the aperture in which said enlarged end of the band engages will leave between them a gap sufficient for the end of the band adjacent the enlargement to pass therethrough, but insufficient for the enlargement itself at the end of the band to pass through.

CHARLES I. LOPDELL.